United States Patent [19]

Shu-en et al.

[11] Patent Number: 5,376,330
[45] Date of Patent: Dec. 27, 1994

[54] PROCESS AND APPARATUS FOR THE PREPARATION OF HYDROGEN STORAGE ALLOYS

[76] Inventors: Hsu Shu-en; Yeah Ming-Tarng; Kao Hwa-Perng, all of Suite 1, 11F, 95-8 Chang Ping Road, Sec. 1, Taichung; Wang Jian-Yih, 40, Alley 58, Lane 141, Ming-Sheng Rd., Lungtan, Taoyuan, all of Taiwan, Prov. of China

[21] Appl. No.: 94,623

[22] Filed: Jul. 21, 1993

[51] Int. Cl.$^5$ .................................... C21D 1/00
[52] U.S. Cl. ......................... 420/590; 266/252
[58] Field of Search ............... 420/590; 266/252, 256, 266/250, 78, 87

[56] References Cited

U.S. PATENT DOCUMENTS 4,396,576 8/1983 Osumi et al. ..................... 420/582

*Primary Examiner*—Deborah Yee

[57] ABSTRACT

Hydrogen storage alloys was successfully prepared by the spontaneous reaction synthesis process. The steps of the spontaneous synthesis process comprises: (a) premixing high H adsorption powder(A), low H adsorption powder(B), catalyst powder(C) with fuel element(D) in an amount corresponding to the atomic ratio of said hydrogen storage alloys, (b) pressing and forming the premixing powders to a predermined density; (c) placing the mixture of step (b) to a spontaneous sysnthesis reactor under protecting environment; (d) preheating the mixture at a temperature of about from 300° to 600° C.; and (e) partially igniting the mixture at a temperature higher than the melting point of the powders used in step (a) to propagate the spontaneous synthesis reaction.

18 Claims, 3 Drawing Sheets

Diagram of SRS-reactor with function of thermal protection

PCT Curves of Hydrogen Storage Alloys synthesized by SRS process

PROCESS AND APPARATUS FOR THE PREPARATION OF HYDROGEN STORAGE ALLOYS

FIELD OF THE INVENTION

This invention relates to new process and apparatus for the preparation of hydrogen storage alloys. More particularly, this invention relates to a spontaneous reaction synthesis process of hydrogen storage alloys which provides increase in the amount of H stored and decrease in expense.

BACKGROUND OF THE INVENTION

Hydrogen can be combined with several metal or alloy to form hydrides. A mixture of high hydrogen adsorption elements, such as Zr, Ti, V, Nd, rare earth metal, and low hydrogen adsorption elements in a suitable ratio can produce hydrogen storage alloys. Hydrogen storage alloys is a special material which can absorb, store and desorb hydrogen. The heat generated during the cycle of H absorption and desorption can be used to industrial application, such as a negative electrode of secondary Ni-MH batteries, heat pump, sensor, actuator, H refining plant and energy storage device.

Hydrogen storage alloys may be produced by various process. In European Pat. No. 0,409,794 (the '794 patent), hydrogen storage alloys were prepared by vacuum induction melting process. The high density, high purity graphite crucible used in the '794 patent for receiving the active reactant was so expensive that the production fee thereof were increase. U.S. Pat. No. 4,643,874 (the '874 patent) disclosed a method of making Ti-containing hydrogen alloy. However, the melting step used in the '874 patent would make the alloys produced without desirable stoichiometry. Therefore, it is needed to develop new preparing process that could either provide improved effects over the prior art methods or over come some of the problems presented in the prior art processes.

SUMMARY OF THE PRESENT INVENTION

Having heretofore discussed the various disadvantages of the process disclosed in the prior art, it is thus the primary object of the present invention to develop a new process and apparatus for preparing hydrogen storage alloys. The advantages of the present invention are control of the compositions of the alloys produced and reduction of the expense and the energy used.

The present invention discloses a process and apparatus for the preparation of hydrogen storage alloys with spontaneous reaction synthesis. The steps of the present spontaneous synthesis process comprises: (a) premixing high H adsorption powder(A), low H adsorption power(B), catalyst powder(C) with fuel element(D) in an amount corresponding to the atomic ratio of the hydrogen storage alloys, (b) pressing and forming the premixing powders to a predetermined density; (c) placing the mixture of step (b) to a sponstaneous synthesis reactor under protecting environment; (d) preheating the mixture at a temperature of about from 300° to 600° C.; and (e) partially igniting the mixture at a temperature higher than the melting point of the powders used in step (a) to propagate the spontaneous synthesis reaction.

Preferrably, the amount of the high H adsorption powder, low H storage capacity powder, catalyst powder and the fuel element used are respectively from 20 to 60 mole %, from 10 to 50 mole %, from 20 to 80 mole % and from 5 to 20 mole %. The high H adsorption powder used in this invention is selected from the group consisting of Zr, Ti, V, Mm and the hydride thereof. The low H adsorption powder used is selected from the group consisting of Mn, Nd, La and the hydride thereof. The catalyst power used is selected from the group consisting of Fe, Co, Ni, Cr and Mo. The fuel element used is selected from the group consisting of Al, Mg, Ca and Cu.

This invention is used to prepared the hydrogen storage alloys, such as (Ti Ar) Mn (Cr Co) Cu, Mm Mn (Ni Cr Co) Al and Ca+Mn) Mn (Ni Cr Co) Al.

The predetermined density used in this invention is about from 60 to 70%. The protecting enviroment used in the step (c) of this invention is selected from the group consisting of inert gas, hydrogen and vacuum environment. A preferred protecting enviroment is Argon atmosphere. The ignition temperature of step (d) is in the range from 900° to 1400° C.

The apparatus for carrying out the preparing process of this invention comprises a reactor having a container and an upper cover to seal with the container. An isolating means is disposed on the container for receiving the reactants used and includes a base portion and a periphery portion. A preheating means encapsulating with the periphery portion of the isolating means to preheat the reactants therein. Means for controlling the preheating temperature provided by the preheating means through the container. Means for partially igniting the reactants is disposed on the upper cover so that the spontaneous synthesis reaction can be started.

Preferrably, the apparatus used in this invention further comprises a gas inlet disposed on the container to control the reacting environment within the container. The present apparatus further comprises a vacuum pump disposed on the upper cover of the reactor.

The base portion of the isolating means is a ceramic isolator and the periphery portion thereof is a thermal isolator.

DETAILED DESCRIPTION OF THE PREFERRED EMBODIMENT

The present invention will now be described more specifically with reference to the following examples. It is to be noted that the following descriptions of examples including preferred embodiments of this invention are presented herein for purposes of illustration and description, it is not intended to be exhaustive or to limit the invention to the precise from disclosed. Obvious modifications or variations are possible in light of the above teachings. The embodiments were chosen and described to provide the best illustration of the principles of this invention and its practical application to thereby enable one of the ordinary skill in the utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

Figure 1:
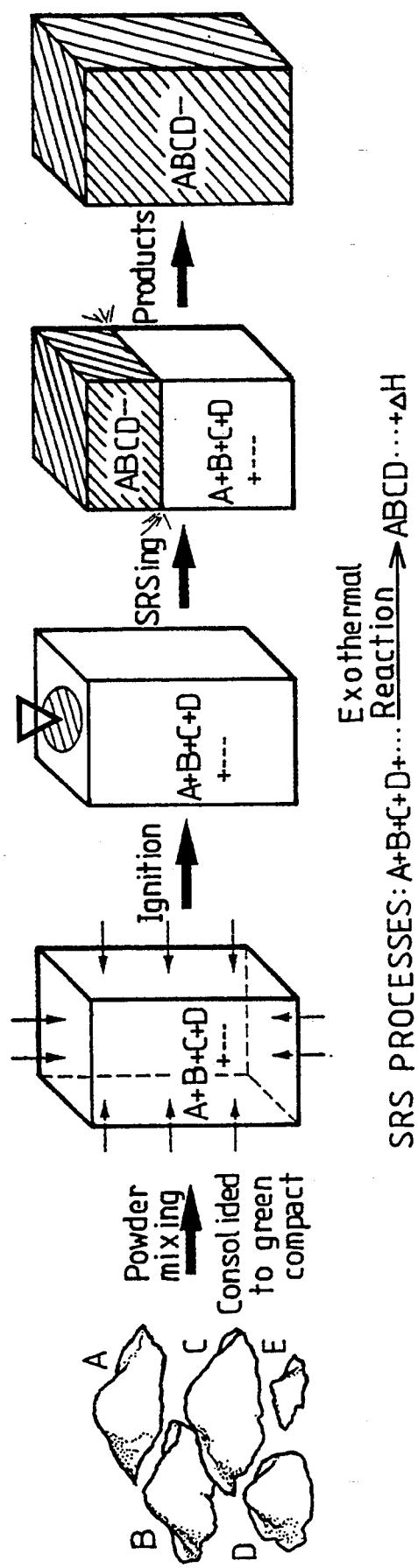
FIG. 1 is a a schematic diagram of a spontaneous reaction synthesis process for producing the hydrogen storage alloys of this invention.

Referring to FIG. 1, there is shown a schematic diagram of a spontaneous reaction synthesis process according to this invention. The present process comprises the step that the starting materials, A, B, C, D and E, were premixed and consolided to green compact. Samples were placed in a box filled with protecting Ar gas. The reaction was spontaneouly propagated as soon as ignition occurred from the top of the sample to the bottom thereof.

Figure 2:
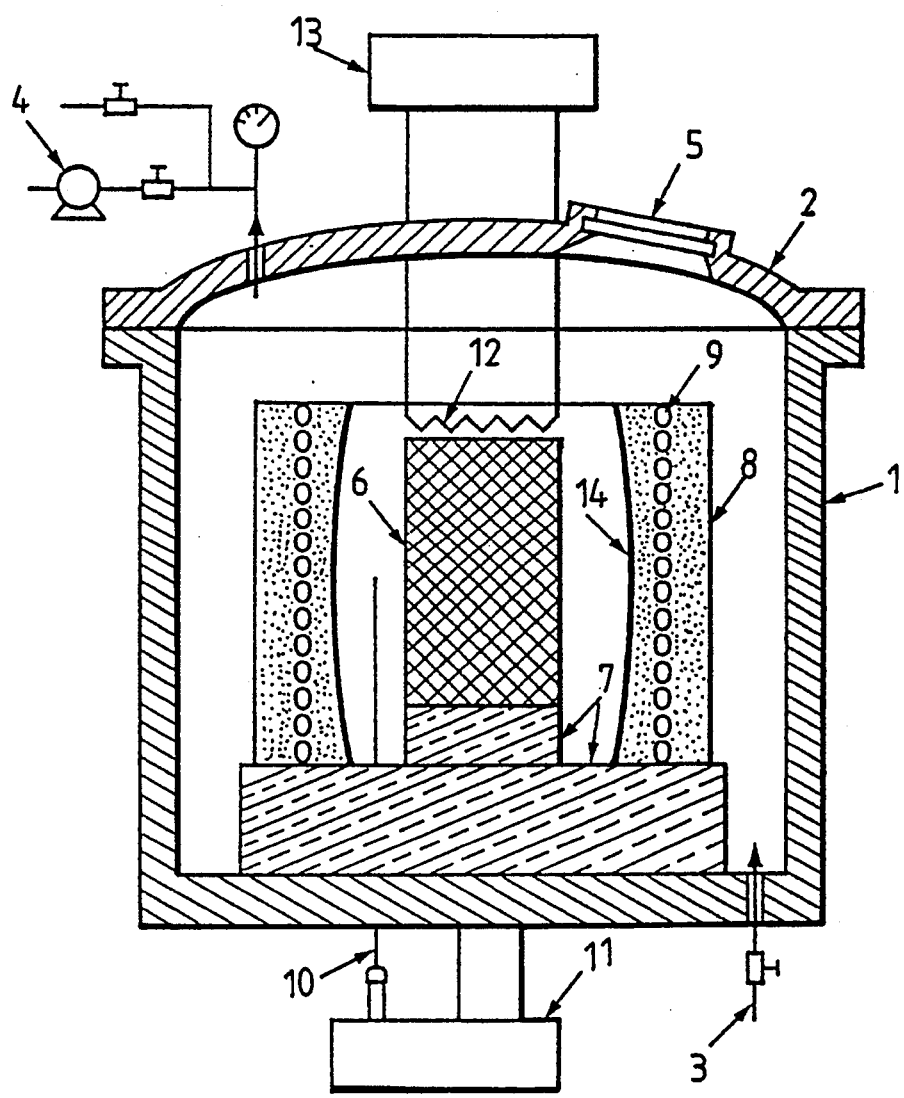
FIG. 2 is a schematic diagram of a spontaneous reaction systhesis reactor according to the present invention.

The apparatus usable to prepare the hydrogen storage alloys by a process according to the present invention is shown on FIG. 2. The apparatus of FIG. 2 includes a container 1 and an upper cover 2. The reactant mixture 6 is placed on a ceramic isolator 7 fixed within the container 1. The reactant mixture 6 is preheated by heating element 9 embedded within thermal isolator 8 at a predetermined preheating temperature controlled by thermal couple 10 and temperature controller 11. An igniting system disposed on the upper cover 2 includes W or Mo heating coil 12 and a stepless adjustment 13 to start the spontaneous reaction of the reactant mixtures. A Mo thermal shielding 14 is further placed on the inside portion of the thermal isolator 8 to maintain the reacting temperature of the reactor for a duration long enough to obtain a homogeneous product. A gas inlet 3 and vacuum pump 4 are used to control the reaction environment. The operator can observe the reaction from a viewer windows 5.

EXAMPLE

The powder of High H adsorption and low H adsorption metal or metal hydrides with particle size finer than 44 μm were mixed with pre-designed stoichiometry as shown in Table 1 . The mixed powder was pressed at 1500 kg/cm to form a pellet with a theoretical density from 60% to 70%. The pellet produced was placed on a ceramic isolator 7 and reduced the pressure to 10 torr. Ar gas was passed through a gas inlet 3 to the container 1. The pellet was preheated by heating element 9 at a predetermined temperature. Then, the top portion of the pellet was ignited by the W or Mo heating coil 12 to induce the spontaneous reaction synthesis process. The reaction temperature of the pellet was maintained by the thermal isolator 8 and the Mo thermal shielding 14 until the reaction stopped.

Figure 3:
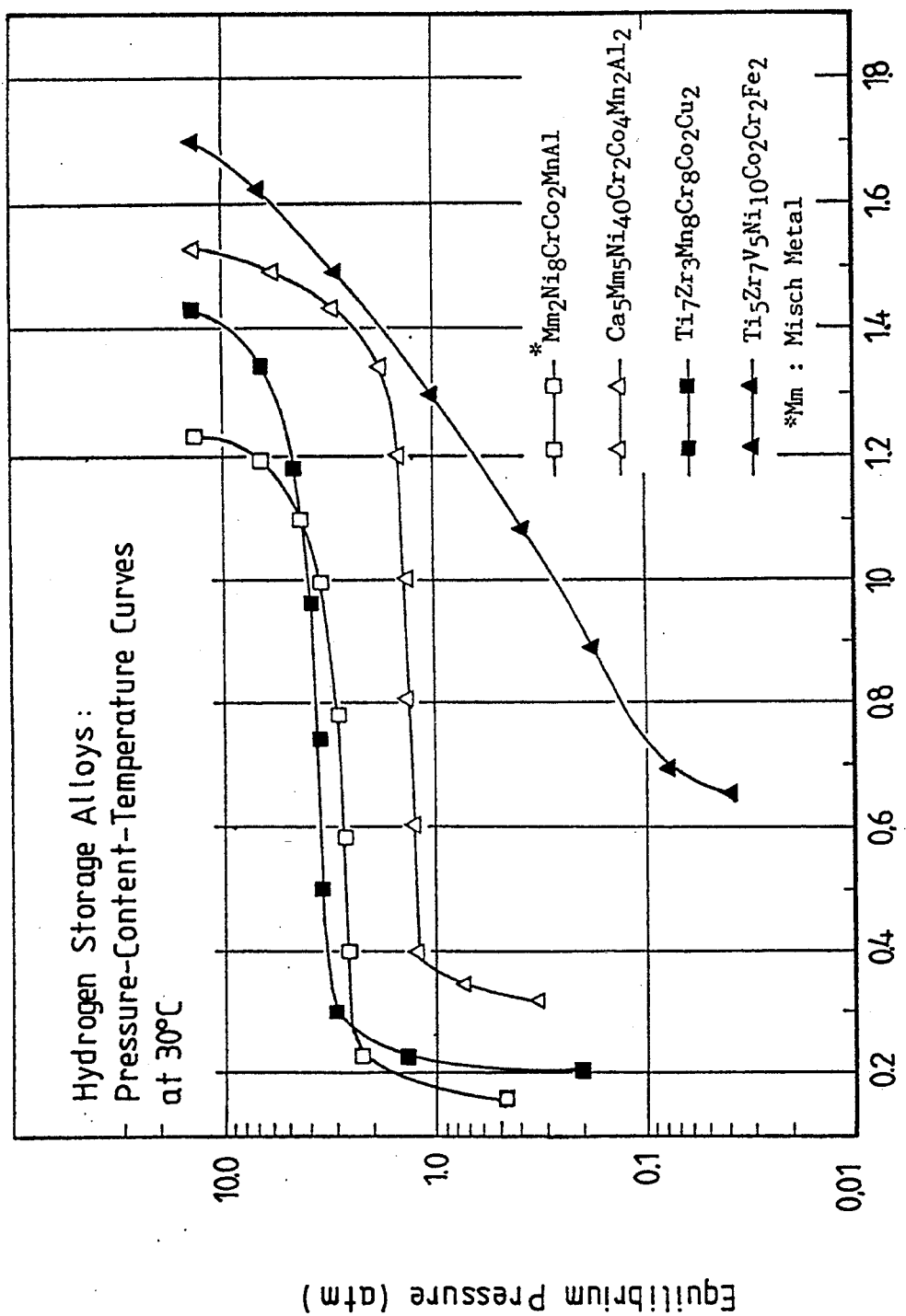
FIG. 3 shows a pressure-content-temperature (PCT) curves of the hydrogen storage alloys prepared by a process according to the present invention.

The hydrogen desorption curve of the hydrogen storage alloys produced by the above-mentioned process were shown in FIG. 3. The effective hydrogen desorption amount was over 1 wt %. The discharge rate of the batteries includes an electrode of the present hydrogen storage alloys is over 300 mA/g. It is evidenced that the hydrogen storage alloys produced is suitable to be a negative electrode of a Ni-MH battery.

TABLE 1

| Alloy composition (atomic percent) | Apparent density (%) | Chamber environment | Preheating temperature (C.) | Ignition temperature (C.) |
|---|---|---|---|---|
| Ti Zr V Ni Co Cr Fe | 60 to 70 | Argon | about 550 | about 1300 |
| Ti Zr Mn Cr Co Cu | 60 to 70 | Argon | about 500 | about 1300 |
| *Mm Ni Cr Co Mn Al | 65 to 70 | Argon | about 300 | about 1100 |
| Ca Mm Ni Cr Co Mn Al | 65 to 70 | Argon | about 300 | about 900 |

*Mm: Misch Metal

We claim:
1. A process for the preparation of hydrogen storage alloys comprising:
   (a) premixing high H adsorption powder(A), low H adsorption powder (B), catalyst powder(C) with fuel element(D) in an amount corresponding to the atomic ratio of said hydrogen storage alloys, wherein said high H adsorption powder and low H adsorption powder are independently selected from the group consisting of metal powder and metal hydride powder;
   (b) pressing and forming said premixing powders to a predetermined density;
   (c) placing said mixtures into a spontaneous synthesis reactor under protecting environment;
   (d) preheating said mixture at a temperature of about 300° to 600° C.; and
   (e) partially igniting said mixtures at a temperature higher than the melting point of said powders to propagate the spontaneous synthesis reaction.

2. A process as claimed in claim 1, wherein the amount of said high H storage capacity powder is 20 to 60 mole %, low H adsorption powder is 10 to 50 mole %, catalyst powder is 20 to 80 mole % and fuel element is 5 to 20 mole %.

3. A process as claimed in claim 1, wherein said high H adsorption powder is selected from the group consisting of Zr, Ti, V, Mm and the hydride thereof.

4. A process as claimed in claim 1, wherein said low H adsorption powder is selected from the group consisting of Mn, Nd, La and the hydride thereof.

5. A process as claimed in claim 1, wherein said catalyst powder is selected from the group consisting of Fe, Co, Ni, Cr and Mo.

6. A process as claimed in claim 1, wherein said fuel element is selected from the group consisting of Al, Mg, Ca and Cu.

7. A process as claimed in claim 1, wherein said hydrogen storage alloy is (Ti Ar) Mn (Cr Co) Cu.

8. A process as claimed in claim 1, wherein said hydrogen storage alloy is Mm Mn (Ni Cr Co) Al.

9. A process as claimed in claim 1, wherein said hydrogen storage alloy is (Ca+Mn) Mn (Ni Cr Co) Al.

10. A process as claimed in claim 1, wherein said predetermined density is about 60 to 70%.

11. A process as claimed in claim 1, wherein said protecting enviroment of step (c) is selected from the group consisting of inert gas, hydrogen and vacuum environment.

12. A process as claimed in claim 11, wherein said protecting environment is Argon atmosphere.

13. A process as claimed in claim 1, wherein said ignition temperature of step (d) is in the range from 900° to 1400° C.

14. An apparatus for preparing hydrogen storage alloys comprising:

a reactor having a container and an upper cover to seal said container; isolating means disposed on said container for receiving the reactants and having a base portion and a periphery portion; preheating means encapsulating with said periphery portion to preheat the reactants;

means for controlling the preheating temperature provided by said preheating means through said container; and means for partially igniting the reactant disposed on said upper cover so that the spontaneous synthesis reaction can be started.

15. An apparatus as claimed in claim 14, further comprising gas inlet means disposed on said container to control the environment within said container.

16. An apparatus as claimed in claim 14, further comprising vacuum pump disposed on said upper cover.

17. An apparatus as claimed in claim 14, further comprising a Mo thermal shielding means disposed on said periphery portion to maintain the temperature of said reactant.

18. An apparatus as claimed in claim 14, wherein said base portion of said isolating means is ceramic isolator and said periphery portion thereof is thermal isolator.

* * * * *